United States Patent [19]
Lecocq

[11] 3,963,564
[45] June 15, 1976

[54] METHOD FOR PREVENTING TRITIUM CONTAMINATION OF SECONDARY SALT AND STEAM IN A MOLTEN SALT REACTOR

[75] Inventor: Alfred Lecocq, Bures-sur-Yvette, France

[73] Assignee: Commisariat a l'Energie Atomique, Paris, France

[22] Filed: Oct. 21, 1974

[21] Appl. No.: 516,421

[30] Foreign Application Priority Data
Oct. 24, 1973 France .............................. 73.37874

[52] U.S. Cl. ................................. 176/37; 176/49; 176/92 B
[51] Int. Cl.² ........................................ G21C 15/00
[58] Field of Search ............... 176/49, 37, 38, 92 R, 176/92 B

[56] References Cited
UNITED STATES PATENTS

| | | | |
|---|---|---|---|
| 2,865,827 | 12/1958 | Dwyer | 176/49 |
| 2,879,157 | 3/1959 | Batutis et al. | 176/37 |
| 3,622,303 | 11/1971 | Hill | 176/37 |
| 3,861,998 | 1/1975 | Okrent et al. | 176/37 |

*Primary Examiner*—Harvey E. Behrend
*Attorney, Agent, or Firm*—McNenny, Pearne, Gordon, Gail Dickinson & Schiller

[57] ABSTRACT

A hydrogen pressure of the order of 1 atmosphere is established in the secondary salt circuit of a molten salt reactor so as to ensure that the hydrogen saturates the secondary salt and diffuses from the secondary salt to the primary salt.

2 Claims, 1 Drawing Figure

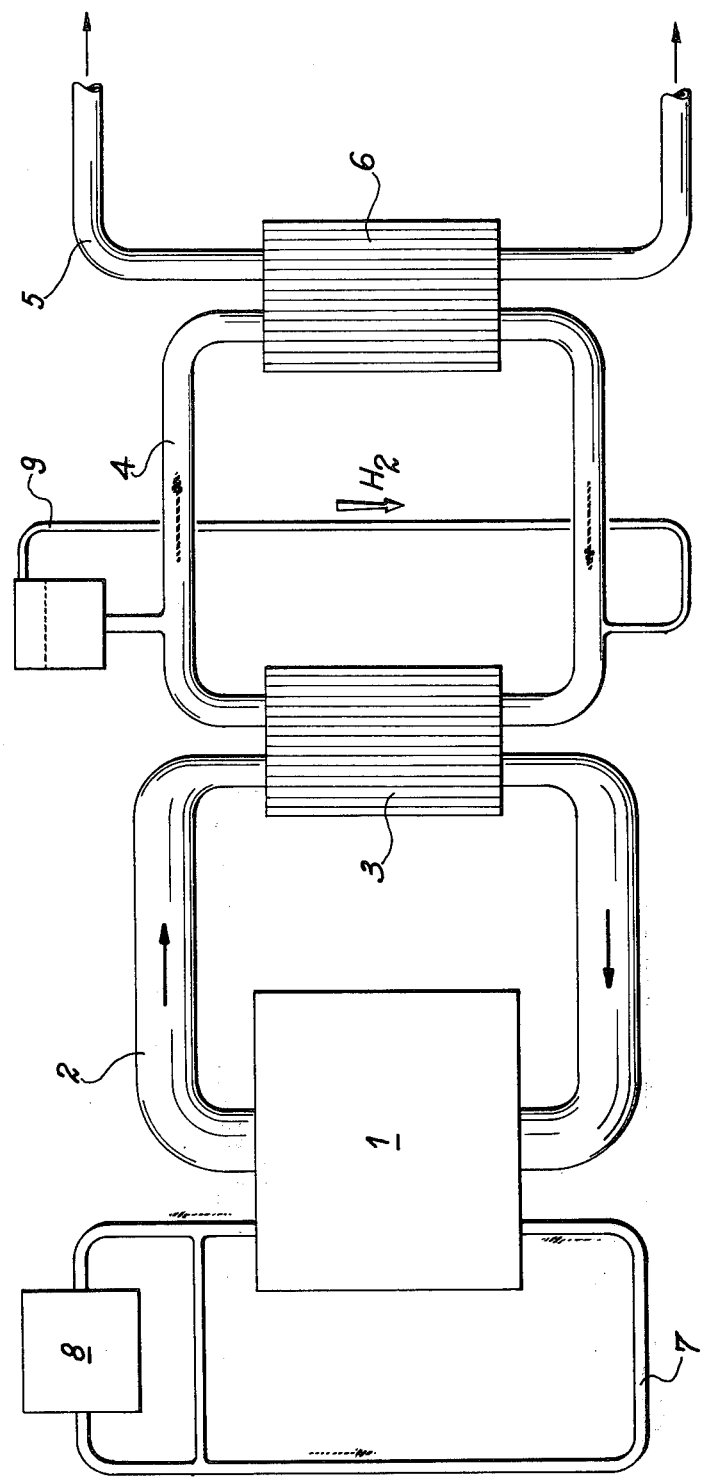

METHOD FOR PREVENTING TRITIUM CONTAMINATION OF SECONDARY SALT AND STEAM IN A MOLTEN SALT REACTOR

This invention relates to a method for preventing tritium contamination of the secondary salt and the steam in a molten salt reactor.

Molten salt reactors are of the type which make use of a liquid fuel consisting of a mixture of molten salts. In the case of fast neutron reactors the fuel is a mixture of chlorides and, in the case of thermal neutron reactors, the fuel is a eutectic mixture of molten salts such as lithium fluoride, beryllium fluoride and the fluoride of $U^{235}$ or $U^{233}$ or alternatively $Pu^{238}$. A graphite moderator is employed in this case.

This liquid fuel which constitutes the primary salt circulates in a loop and, by means of a primary heat exchanger, transfers its heat to a secondary salt constituted for example by a mixture of lithium fluoride and beryllium fluoride or by a sodium fluoborate. Said secondary salt also circulates within a loop and transfers its heat by means of a secondary heat exchanger to a steam circuit which is intended to be converted to electrical energy. In addition, a sweep gas such as helium is circulated within the reactor core itself in order to carry away the fission products and the tritium which has formed.

More especially in molten salt reactors which operate in the thermal neutron energy range, large quantities of tritium are in fact formed under the action of radiations on the salts employed and on lithium fluoride in particular. Said tritium is formed as a result of the following reactions:

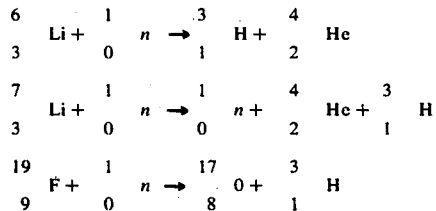

It can be estimated that the tritium production is about 2400 Curies per day in a molten salt reactor having a power rating of 1000 MWe. The tritium which is formed in the primary salt circuit diffuses through the walls of the primary heat exchanger, then through the walls of the secondary heat exchanger and is finally present within the steam circuit of the electric generator. It is very difficult at this stage to confine the tritium and this consequently gives rise to a considerable risk of atmospheric pollution.

In order to prevent this contamination, a desirable objective consists in reducing the flow of tritium into the steam circuit as far as possible and many solutions have been proposed for the achievement of this objective.

For example, it has been endeavored to induce the displacement of chemical equilibria within the primary salt circuit by hydrogen bubbling so as to promote the reaction $½ H_2 + UF_4 \rightarrow UF_3 + HF$. Bubbling with hydrogen therefore results in the formation of hydrofluoric acid which is more readily soluble in the gas phase, is therefore more readily entrained by the reactor sweep gas and consequently entrains part of the tritium which has formed. The disadvantage of this method, however, lies in the fact that there is an attendant danger of corrosion by the hydrofluoric acid which is formed. It has also been proposed to induce displacements of equilibria in the secondary salt such as sodium fluoborate, for example, by forming a complex of the $NaBeF_3.OH$ type in the presence of oxygen, thus causing blockage of the tritium within the secondary loop.

Another method consists in chemically adsorbing the tritium within the primary circuit or within the secondary circuit by formation of tritides (such as yttrium, for example). But these compounds have low stability at high temperature and readily decompose with the result that the decontamination is wholly temporary.

It is also possible to form on the heat-exchanger walls solid barriers which prevent diffusion of the tritium. This can be achieved by making use of a heat exchanger formed of a steel containing a substance such as zirconium which is capable of retaining the tritium. It is also possible to deposit on the heat-transfer surfaces of the exchangers layers of oxides or of metals such as molybdenum which reduce the permeability of the metals or materials constituting the heat exchangers.

The method in accordance with the invention overcomes the disadvantages recalled in the foregoing and accordingly permits the achievement of good tritium decontamination of the secondary circuit and of the steam circuit of a molten salt reactor, this being performed both simply and easily.

The method under consideration essentially consists in establishing within the secondary salt circuit a hydrogen pressure such that the hydrogen saturates the secondary salt and diffuses from the secondary salt to the primary salt.

The hydrogen which is thus passed into the secondary circuit dissolves in the secondary salt and diffuses into the primary heat exchanger. At the level of the primary heat-exchanger wall, the molecular hydrogen and tritium dissociate in the metal of the heat exchanger or at the interface. There is thus generated a stream of atomic hydrogen countercurrent to the natural flow of tritium and this countercurrent flow of hydrogen prevents the flow of tritium.

The flowing streams of the two tritium elements and hydrogen are not solely a function of the respective partial pressures of each substance on each side of the heat-transfer wall but also of the molecular interactions which take place in the salts on each side of the wall, at the salt-material interfaces constituting the heat exchanger and within this material. The conditions are set for a sufficient probability of interatomic collisions between the hydrogen atoms and the tritium atoms so as to ensure that the tritium is finally discharged from the primary heat exchanger to the primary salt circuit. Thus the tritium does not contaminate the secondary salt circuit and consequently the steam circuit.

A better understanding of the invention will be obtained from the following description of one mode of execution of the method according to the invention, reference being made to the accompanying FIGURE which shows diagrammatically a molten salt reactor and the arrangements which are related thereto.

There is shown in this FIGURE the reactor core 1 containing the initial liquid fuel mixture which constitutes the primary salt, the circuit 2 for circulating said primary salt, the primary heat exchanger 3 in which the primary salt transfers its heat to the secondary salt circuit 4, the heat of the secondary salt being transferred to the steam circuit 5 by means of the secondary heat exchanger 6. A sweep gas circuit 7 is connected to the reactor core 1. This circuit 7 is provided with a by-pass in which is placed a device 8 for treating part of the sweep gas so as to remove the entrained fission products and tritium therefrom.

In accordance with the invention, there is provided at one point of the secondary salt circuit 4 a circuit 9 for the circulation of hydrogen at a pressure such as to saturate the secondary salt. The hydrogen therefore dissolves in said secondary salt and diffuses through the primary heat exchanger 3.

The primary salt consists of a mixture of lithium fluoride, beryllium fluoride and $U^{235}$ fluoride whilst the secondary salt consists of sodium fluoborate and the sweep gas consists of helium.

In this example, 18% of the sweep helium is continuously oxidized at 8 so as to remove the tritium therefrom; the partial pressure of said tritium in the helium is approximately $11.3 \times 10^{-6}$ atmospheres. The partial pressure of the hydrogen which is established in the secondary salt can be in the vicinity of 1 atmosphere without any difficulty. This is particularly advantageous since the reactor operates at atmospheric pressure.

The flow rate of hydrogen is therefore approximately 600 times higher than the flow rate of tritium.

Moreover, chemical phenomena of dissociation and recombination take place at the interfaces between the molten salts and the metal or material of the primary heat exchanger: these phenomena occur between tritium molecules spaced at approximately 370 A whereas the hydrogen atoms at the interface on the metal or material side have an average spacing of 15 A. Within the interior of the material constituting the primary heat exchanger 3, the concentrations of tritium atoms and of hydrogen atoms correspond exactly to the concentrations in the primary and secondary salts. In the primary salt, the tritium concentration is $2 \times 10^{12}$ molecules per $cm^3$ whereas the hydrogen concentration in the secondary salt is $1.8 \times 10^{17}$ molecules per $cm^3$. Moreover, the mean free path of the tritium atoms within the heat exhchanger, as established by the physical configuration of the material, is close in value to the mean distance between the atoms of the hydrogen stream. The foregoing generally serves to show that there is a very high probability of collisions between the tritium atoms and the hydrogen atoms at the level of the wall of the primary heat exchanger 3.

Thus a large proportion of the tritium atoms newly formed in contact with the material constituting the primary heat exchanger is recombined with the hydrogen atoms as these latter leave said heat exchanger and is consequently caused to turn back.

By virtue of the method in accordance with the invention, there is thus obtained good tritium decontamination of the secondary circuit and of the steam circuit of a molten salt reactor.

What we claim is:

1. A method for preventing tritium contamination of the secondary salt and of the steam within a molten salt reactor, wherein said method consists in establishing within the secondary salt circuit a hydrogen pressure such that the hydrogen saturates the secondary salt and diffuses from said secondary salt to the primary salt.

2. A method according to claim 1, wherein the pressure of hydrogen in the secondary salt is in the vicinity of 1 atmosphere.

* * * * *